United States Patent Office 3,035,334
Patented May 22, 1962

3,035,334
WELDING RODS
Albert Edward Salt, Sutton Coldfield, England, assignor to Imperial Chemical Industries Limited, London, England, a corporation of Great Britain
No Drawing. Filed Dec. 15, 1958, Ser. No. 780,268
Claims priority, application Great Britain Dec. 20, 1957
11 Claims. (Cl. 29—182)

This invention relates to welding rods.

It has been proposed to use eutectic or eutectic-containing titanium-base alloys for brazing titanium articles. Such alloys are, however, in many cases, too brittle to fabricate by the normal reducing processes. One method by which these alloys may be manufactured into welding rods, when one of the constituents is ductile, is to form the ductile constituent into a tube and to fill the tube with the remaining alloying ingredients in powder form. The tube is then reduced to consolidate the constituents.

This method suffers from disadvantages, such as difficulty in controlling composition accurately and consistently, the use of expensive tubing to achieve certain compositions and unsatisfactory alloying behaviour of the constituents of the rod during the short space of time for which the alloys are molten.

According to the present invention a method of fabricating welding or brazing rods of eutectic or eutectic-containing titanium-base alloy comprises the steps of mixing together the required proportions of alloying constituents in powder form, the constituents having a particle size of less than 250 microns, compacting the powder mixture into the form of a sheet or a plate, subjecting the sheet or the plate to a sintering treatment in a vacuum or inert atmosphere at a temperature such that the sheet or plate after sintering and cooling is capable of being machined, and then machining the resulting sheet or plate to form rods.

Eutectic or eutectic-containing titanium-base alloys, especially those having compositions close to the eutectic compositions, are very hard and brittle materials which cannot be fabricated by normal methods, but which are useful for brazing or welding and for providing, in the form of a deposited coating, a hard surface on titanium and titanium-base articles. A useful alloy is a ternary eutectic-containing alloy of titanium, nickel and copper, nickel being present in the range 20% to 35% and copper up to 10%, particularly the eutectic alloy which contains 28% nickel and 10% copper. Other useful alloys are binary eutectic or eutectic-containing alloys including titanium-nickel (eutectic composition about 28% nickel, preferred range 20% to 35% nickel), titanium-manganese (eutectic composition about 42.5% manganese, preferred range 35% to 45% manganese), titanium-cobalt (eutectic composition about 28% cobalt, preferred range 20% to 32% cobalt), and titanium-silicon (eutectic composition about 8.5% silicon, preferred range 6% to 10% silicon). Ternary titanium eutectic or eutectic-containing alloys prepared from these alloying constituents are also useful.

Preferably, the powdered alloying constituents are capable of passing through a sieve having an aperture of 150 microns since the use of fine powder enables alloying to take place quickly during sintering and has the further advantage that microscopic segregation of the constituents is minimised. Suitable sieves for the powders are 60 meshes per linear inch (British Standard) for passing particles smaller than 250 microns and 100 meshes per linear inch (British Standard) for passing particles smaller than 150 microns.

The alloying constituents should be intimately mixed together and segregation of one or more constituents during subsequent handling should be avoided.

The powder mixture may be compacted into plates or sheets at moderate pressures by various known methods such as mechanical pressing with a conventional punch and die set, hydrostatic pressing or by roll-compacting. Hot pressing in a protective atmosphere is a further alternative. It is, of course, possible to compact such powder mixtures in rods of a size suitable for welding, but such a process is usually unsatisfactory on a commercial scale.

Of these methods of compacting, roll-compacting is preferred. Long lengths of uniformly compacted material, of a thickness considerably less than die-compacted material, can be produced by roll-compacting, e.g. roll-compacting produces material 0.1 inch thick whilst die-compacting is limited to a minimum of 0.2 inch. Thin roll-compacted material may be sintered at a lower temperature and, as a result, may be cut with a thinner cutter than in the case of die-compacted material. Thus thinner rods and less cutting waste may be obtained by use of the roll-compacting process.

In roll-compacting, the powder mixture is passed through the nip of a pair of rolls of a rolling mill and the powder is thereby compacted into the form of a strip.

It is desirable that the compacts should have a density as near as possible to the theoretically highest density of the alloy composition being treated.

The compacts are subjected to a controlled sintering treatment in a vacuum or in an inert atmosphere so that sufficient strength is imparted to the material to withstand machining operations such as slitting, the sintering treatment being such that the extent to which interdiffusion occurs is insufficient to embrittle the inherently ductile skeletal matrix.

Sintering is preferably carried out between 650° C. and 800° C. and the extent to which alloying, and formation of brittle constituents, occurs, depends upon the duration of the sintering operation. The temperature chosen should be as low in the above range as is consistent with an economic period of treatment and is influenced by such factors as thickness of the compact and the nature of the compacting process. In the case of the titanium-nickel-copper powder mixture, the roll-compacted material can be sintered at a somewhat lower temperature than die-compacted material, i.e. at 690° C. instead of 750° C. With a sintering period of 30 minutes, treatment at temperatures below 650° C. produces material which is not strong enough to withstand stresses imposed by machining operations, whilst treatment at temperatures above 800° C. produces material which is to hard and brittle for satisfactory machining. Sintering is carried out under vacuum or in an atmosphere of an inert gas such as argon and, as used in the claims, the term inert atmosphere includes both.

Powder mixtures containing maganese, cobalt or silicon may require somewhat higher sintering temperatures than the mixtures containing nickel and copper.

After sintering, the compacts are sub-divided into rods of the desired cross-section by, for example, slitting on a milling machine or, where the properties of the compacts permit, by shearing.

*Example 1*

A powder mixture of titanium, nickel and copper was made up from the follow constituents:

62 parts of sodium-reduced titanium powder, having a particle size less than 150 microns, 28 parts of carbonyl nickel powder of mean particle size 6 microns, 10 parts of chemically-precipitated copper powder, having a particle size less than 150 microns.

Rectangular plates measuring 6 in. x 1 in. x 0.2 in. were compacted in a conventional die and punch set using a pressure of 20 tons/inch$^2$. Density of the plates was about 4.4 gm./cm.$^3$. Plates were sintered in a high purity argon atmosphere for 30 minutes at 750° C. Plates were then slit on a conventional milling machine to give rods 6 in. x 0.2 in. x 0.1 in. which were sufficiently strong to withstand normal handling.

*Example 2*

A powder mixture of titanium, nickel and copper was made up from the following constituents:
62 parts of sodium-reduced titanium powder, having a particle size less than 150 microns,
28 parts of carbonyl nickel powder of mean particle size 6 microns,
10 parts of chemically-precipitated copper powder, having a particle size less than 150 microns.

The mixture was roll-compacted to a thickness of 0.1 inch to form plates 18 inches long having a density approaching 85% of the theoretical density. The plates were sintered in argon at 690° C. for 30 minutes and then slit by milling into rods 18 in. x 0.1 in. x 0.1 in. which were sufficiently strong to withstand normal handling.

Rods prepared as described were melted satisfactorily with inert-gas arc-welding equipment, and are suitable for applying hard-facing compositions to titanium.

I claim:
1. A method of fabricating welding and brazing rods of a member of the group consisting of eutectic and eutectic-containing titanium base alloys which comprises mixing together powders of the metallic components of the alloy having a particle size of less than 250 microns, compacting the powder mixture into the form of a self-supporting sheet, sintering the compacted sheet in an inert atmosphere by heating to a temperature between 650° and 800° C., cooling the sheet, and machining the resulting sheet to form rods.

2. A method as claimed in claim 1, in which the titanium-base alloy consists of 20% to 35% of nickel and up to 10% of copper with unavoidable impurities.

3. The method of claim 1 wherein the sheet is formed by roll-compacting to a thickness of up to about 0.1 inch.

4. The method of claim 3 wherein the powder comprises 62 parts by weight titanium, 28 parts by weight nickel and 10 parts by weight copper and the sintering temperature is about 690° C.

5. The method of claim 4 wherein the titanium is sodium reduced titanium having a particle size less than 150 microns, the nickel is carbonyl nickel powder having a mean particle size of 6 microns and the copper is chemically-precipitated powder having a mean particle size less than 150 microns, and the compacted sheet is sintered for 30 minutes.

6. Welding and brazing rods obtained by the method of claim 1.

7. Welding and brazing rods obtained by the method of claim 5.

8. The method of claim 1 wherein the titanium base alloy is an alloy of titanium with at least one metal selected from the group consisting of nickel, copper, manganese, cobalt and silicon, and the sheet is formed by roll-compacting to a sheet thickness no greater than 0.2 inch.

9. The method of claim 8 wherein the powder mixture is a mixture of 20 to 35% nickel, up to 10% copper and the balance essentially titanium, and the sintering temperature is between 690° and 750° C.

10. A method of fabricating a member of the group consisting of eutectic and eutectic-containing titanium-base alloy welding and brazing rods which comprises roll-compacting a powder mixture comprising 62 parts by weight of titanium powder having a particle size of less than 250 microns, 28 parts by weight of nickel powder having a particle size of less than 250 microns, and 10 parts by weight of copper powder having a particle size of less than 250 microns, to form a rectangular self-supporting sheet member, thereafter sintering said sheet member in an inert gas atmosphere at a temperature between 650° C. and 800° C., cooling the sintered sheet member and dividing the same up to form rods.

11. The method of claim 10 wherein said sheet is sintered for 30 minutes at 690° C.

References Cited in the file of this patent
UNITED STATES PATENTS

| | | |
|---|---|---|
| 2,121,194 | Hardy | June 21, 1938 |
| 2,337,588 | Calkins | Dec. 28, 1943 |
| 2,771,637 | Silvasy et al. | Nov. 27, 1956 |
| 2,822,269 | Long | Feb. 4, 1958 |
| 2,889,224 | Evans et al. | June 2, 1959 |